(12) United States Patent
Balzer et al.

(10) Patent No.: US 9,517,796 B2
(45) Date of Patent: Dec. 13, 2016

(54) THIN-WALLED MAGNESIUM DIECAST SHOCK TOWER FOR USE IN A VEHICLE

(71) Applicant: Ford Global Technologies, LLC, Dearborn, MI (US)

(72) Inventors: Jason Scott Balzer, Commerce Township, MI (US); Vladimir Vladimirovich Bogachuk, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/642,024

(22) Filed: Mar. 9, 2015

(65) Prior Publication Data
US 2016/0264176 A1    Sep. 15, 2016

(51) Int. Cl.
| B60N 99/00 | (2006.01) |
| B62D 21/11 | (2006.01) |
| B62D 27/02 | (2006.01) |

(52) U.S. Cl.
CPC .............. *B62D 21/11* (2013.01); *B62D 27/02* (2013.01)

(58) Field of Classification Search
CPC .................................. B62D 21/11; B62D 27/02
See application file for complete search history.

(56) References Cited

U.S. PATENT DOCUMENTS

| 5,456,517 A * | 10/1995 | Kalian | B60G 15/068 |
| | | | 164/47 |
| 5,897,139 A | 4/1999 | Aloe et al. | |
| 5,947,519 A | 9/1999 | Aloe et al. | |
| 6,047,988 A | 4/2000 | Aloe et al. | |
| 6,193,273 B1 | 2/2001 | Novak et al. | |
| 6,666,501 B1 | 12/2003 | Logan et al. | |

(Continued)

FOREIGN PATENT DOCUMENTS

| DE | 102010055445 A1 | 6/2012 |
| DE | 102011012940 A1 | 9/2012 |

(Continued)

OTHER PUBLICATIONS

Alan A. Luo, Magnesium casting technology for structural applications, Journal of Magnesium and Alloys, 2013, pp. 2-22.

(Continued)

*Primary Examiner* — Lori L Lyjak
(74) *Attorney, Agent, or Firm* — LeClairRyan

(57) ABSTRACT

A shock tower assembly includes a cast shock tower body composed of magnesium or magnesium alloy and at least one steel bridging bracket. An insulating adhesive layer is formed between the tower body and the bracket. A mechanical fastener is used for fastening the tower body to the bracket. One or more structural ribbings are formed on the tower body. The mechanical fastener may be selected from any of several mechanical fasteners, including self-piercing rivets. Alternatively, a screw boss may be formed for receiving a screw. The rivet may be inserted from the bracket into the shock tower body or from the shock tower body into the bracket in which case an insulating layer is positioned between the head of the self-piercing rivet and the cast shock tower body. A sealant is preferably formed along the intersection of the cast shock tower body and the steel bridging bracket.

19 Claims, 5 Drawing Sheets

(56) References Cited

U.S. PATENT DOCUMENTS

| | | |
|---|---|---|
| 7,125,067 B2 | 10/2006 | Bonnett et al. |
| 7,153,374 B2 | 12/2006 | Kikawa et al. |
| 7,210,733 B2 | 5/2007 | Mouch et a |
| 8,033,596 B2 | 10/2011 | Neumann et al. |
| 2012/0169023 A1 | 7/2012 | Rawlinson et al. |
| 2013/0119630 A1 | 5/2013 | Hulbert et al. |

FOREIGN PATENT DOCUMENTS

| | | |
|---|---|---|
| DE | 102011081430 A1 | 2/2013 |
| DE | 102012021634 A1 | 5/2014 |
| EP | 0994007 A2 | 4/2000 |
| WO | 2007019935 A1 | 2/2007 |

OTHER PUBLICATIONS

Stephen D. Logan, Magnesium-Intensive Front End Sub-Structure Development, USAMP, AMP800, 2014 DOE Merit Review Presentation, Jun. 18, 2014.

* cited by examiner

THIN-WALLED MAGNESIUM DIECAST SHOCK TOWER FOR USE IN A VEHICLE

TECHNICAL FIELD

The disclosed inventive concept relates to shock towers for automotive vehicles. More particularly, the disclosed inventive concept relates to a thin-walled diecast shock tower formed from either magnesium or magnesium alloy.

BACKGROUND OF THE INVENTION

Weight reduction to achieve improved fuel economy is perhaps the most critical goals of vehicle manufacturers today. Achieving this goal must be undertaken without sacrificing the structural integrity of the vehicle while at the same time making the vehicle affordable.

The central approach being taken by manufacturers today toward increased vehicle fuel economy has been the reduction of material weight. To this end, ventures are being taken to incorporate aluminum into vehicle structures which were, at one time, steel.

One structural component that has been traditionally been formed from steel is the shock tower. The most common shock tower is a multi-piece, stamped steel assembly. This construction offers a very inexpensive method to meet the vehicle's NVH, durability and safety requirements. However, shock towers formed from stamped steel are very heavy, and thus are not a solution to the goal of overall vehicle weight reduction.

A less common approach to shock tower construction is for the shock tower to be formed from aluminum by Vacuum High Pressure Die Casting (VHPDC). While resulting in a tower that is lighter than steel, the product is more expensive than its steel counterpart. Particularly, the process for manufacturing an aluminum shock tower by way of VHPDC is very intensive, as the production method relies upon a vacuum assist HPDC machine. The resulting product must be subjected to x-ray examination to check porosity. The product must also be heat treated to improve the properties, straightened to remove the warping which occurs during heat treatment, and then subjected to machining of any holes and attachment surfaces.

In addition to a cumbersome and labor-intensive manufacturing process, aluminum shock towers are typically over-designed to compensate for the challenges faced in the VHPDC process. Specifically, the process requires that the minimum wall stock be approximately 2.5 mm in thickness, provided that ribbing is added to provide the minimum structural integrity. However, the minimum thickness results in a heavier and thus more expensive shock tower, undermining the very benefit that aluminum-bases production was intended to achieve.

While known vehicle shock towers function to meet most expectations, they suffer from either being too heavy, as is the case for steel shock towers, or are too expensive to produce, as is the case for aluminum shock towers. Accordingly, a practical alternative to known shock towers is desired.

SUMMARY OF THE INVENTION

The disclosed inventive concept overcomes the problems associated with known shock towers by providing a shock tower assembly that includes a cast shock tower body composed of magnesium or magnesium alloy and at least one steel bridging bracket. An insulating adhesive layer is formed between the cast shock tower body and the steel bridging bracket. A mechanical fastener is used for fastening the cast shock tower body to said steel bridging bracket. One or more structural ribbings for adding strength may be formed on the cast shock tower body.

The mechanical fastener may be selected from any of several mechanical fasteners, although a rivet, particularly a self-piercing rivet is preferred. As an alternative or in addition, a screw boss may be formed on either the cast shock tower body or on the steel bridging bracket for receiving a screw.

The self-piercing rivet may be inserted from the steel bridging bracket into the cast shock tower body or from the cast shock tower body into the steel bridging bracket. Insofar as the typical self-piercing rivet is steel, to prevent a galvanic reaction, a layer of insulating material, such as tape, is positioned between the head of the self-piercing rivet and the cast shock tower body, when the rivet is inserted from the cast shock tower body into the steel bracket.

The steel bridging bracket may be of any of several brackets, such as, but not limited to, a shotgun bracket a dash cross member bracket, and a rail bracket. A sealant is preferably formed along the intersection of the cast shock tower body and the steel bridging bracket.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
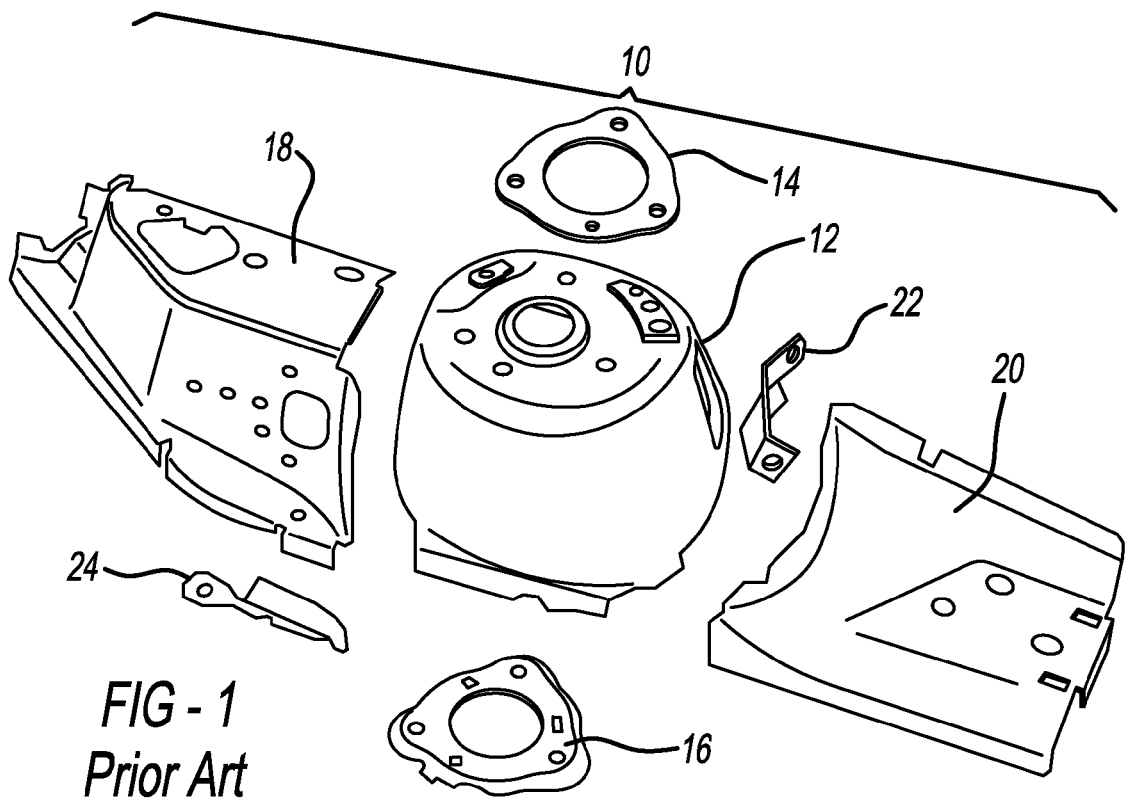
FIG. 1 is a perspective view of components that comprise the typical known shock tower assembly.

In the following figures, the same reference numerals will be used to refer to the same components. In the following description, various operating parameters and components are described for different constructed embodiments. These specific parameters and components are included as examples and are not meant to be limiting.

The disclosed inventive concept is described below as being for a shock tower assembly. However, it is to be understood that the following description and accompanying figures may have utility as well in other areas of the automotive vehicle, such as in other areas of the vehicle frame or vehicle body. Furthermore, it is to be understood that the shape and configuration of the illustrated shock tower are intended as being suggestive only insofar it is expected that other shapes and configurations may be suitable for full execution of the disclosed inventive concept.

As noted above, the typical shock tower assembly combines seven individual stamped components into one assembly. This arrangement requires substantial investment in the body shop in terms of tools and labor. A typical conventional shock tower assembly is shown in FIG. 1 in which a shock tower assembly 10 is illustrated in exploded view. The shock tower assembly 10 includes a dome portion 12, an upper strut bracket 14, and a lower strut bracket 16. Additional components of the conventional shock tower assembly 10 include a forward flange 18, a rearward flange 20, a first side bracket 22, and a second side bracket 24. Assembly this number of stampings requires a great investment of labor needed to select, assemble and fasten the individual parts together to form the single shock tower assembly 10. In addition, the shock tower assembly 10 that is formed from the several individual stampings is at a greater potential risk for malfunction due to the possibility that the individual components will become separated from one another.

The disclosed inventive concept overcomes the challenges faced by known shock tower assemblies by providing a shock tower assembly that is lightweight, relatively easy to assembly and that utilizes a minimum number of individual components. The shock tower itself is formed from either magnesium or magnesium alloy, thus providing a component that is between about 4.0-6.0 kg lighter than steel and is between about 0.8 and 1.0 kg lighter than aluminum. This lower weight is enabled because both magnesium and magnesium alloy have lower densities and improved casting performance than aluminum. In addition, magnesium and magnesium alloy are easier to cast than aluminum, since these materials do not require a vacuum assist. Furthermore, components formed from magnesium and magnesium alloy do not require post-casting x-raying, heat treating, straightening, or machining, thus providing a considerable production advantage over aluminum. The dies used in magnesium and magnesium alloy casting last 150% longer than dies used in casting aluminum components.

These advantages result in a shock tower assembly that saves between about 4.0-6.0 kg per vehicle and represents a slight cost increase over conventional steel towers, but this amount is easily offset when increased fuel mileage is taken into consideration. On the other hand, production costs using magnesium or magnesium alloy represents a savings of about half the cost per vehicle when compared with shock towers formed from aluminum. Shock towers produced from magnesium or magnesium alloy also demonstrate greater vibration-absorbing ability and thus have a significant damping capacity.

Figure 7:
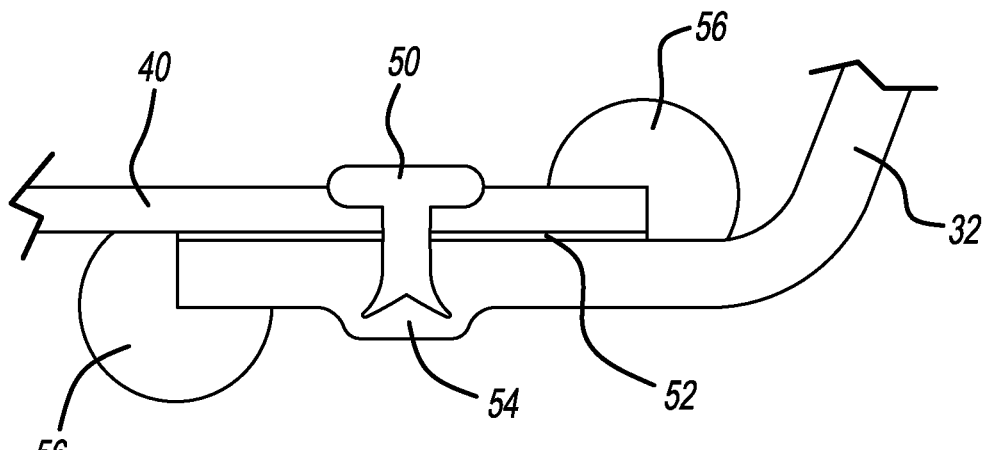
FIG. 7 is a sectional view illustrating an alternative method of joining steel and magnesium components using a rivet in combination with an adhesive and sealer according to the disclosed inventive concept.
Figure 8:
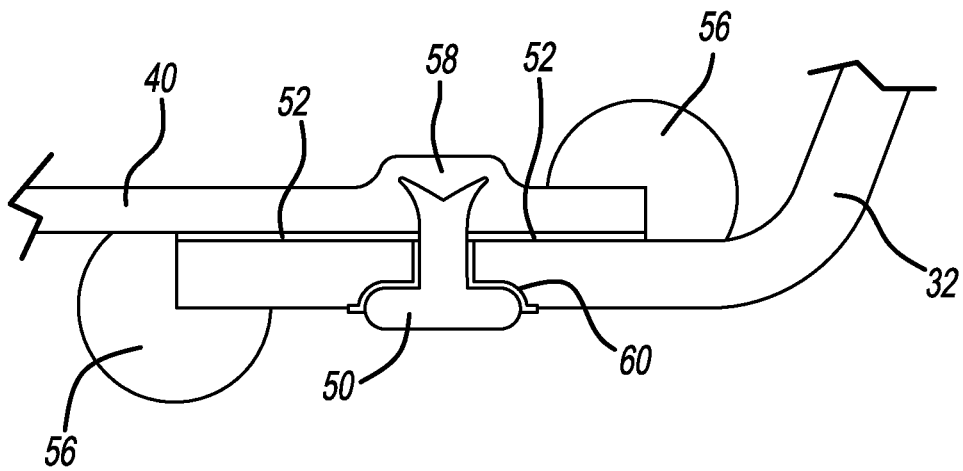
FIG. 8 is a sectional view illustrating the method of joining steel and magnesium components using a rivet in combination with an adhesive and sealer as well as insulating layer according to the disclosed inventive concept.
Figure 9:
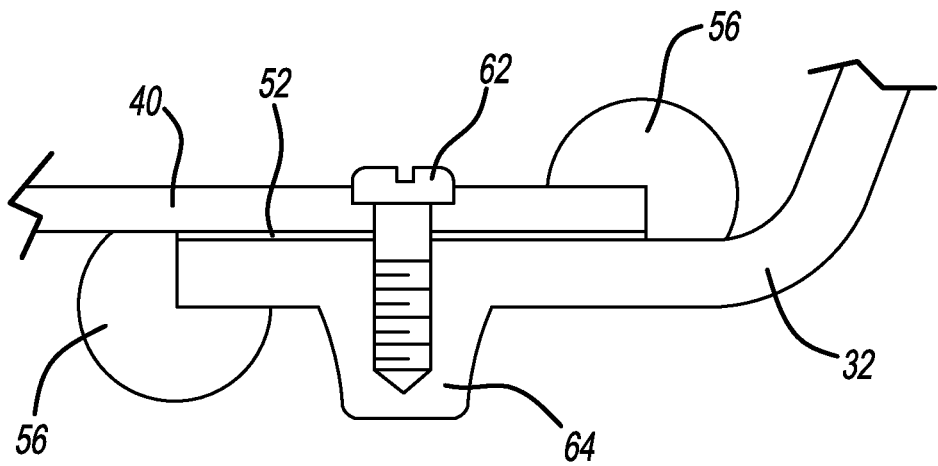
FIG. 9 is a sectional view illustrating the method of joining steel and magnesium components using a screw in combination with an adhesive and sealer according to the disclosed inventive concept.
Figure 10:
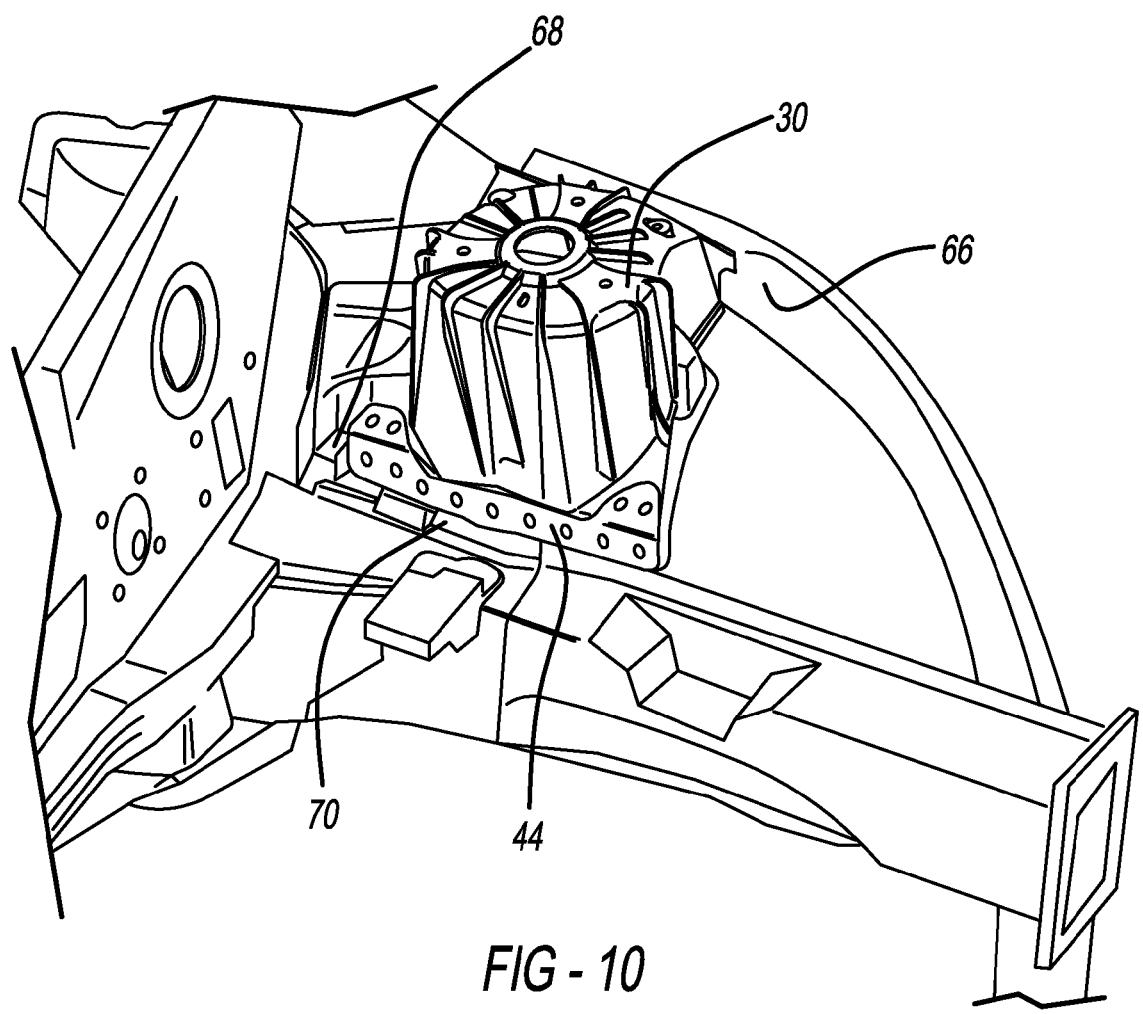
FIG. 10 is a perspective view of the shock tower assembly of the disclosed inventive concept in place in a vehicle.

The shock tower assembly of the disclosed inventive concept is illustrated in both assembled and exploded views in FIGS. 2 through 6, while an illustration of the method for assembling the shock tower of the disclosed inventive concept is illustrated in FIGS. 7 through 9. A view of a suggested, non-limiting placement of the shock tower assembly of the disclosed inventive concept is illustrated in FIG. 10.

Figure 2:
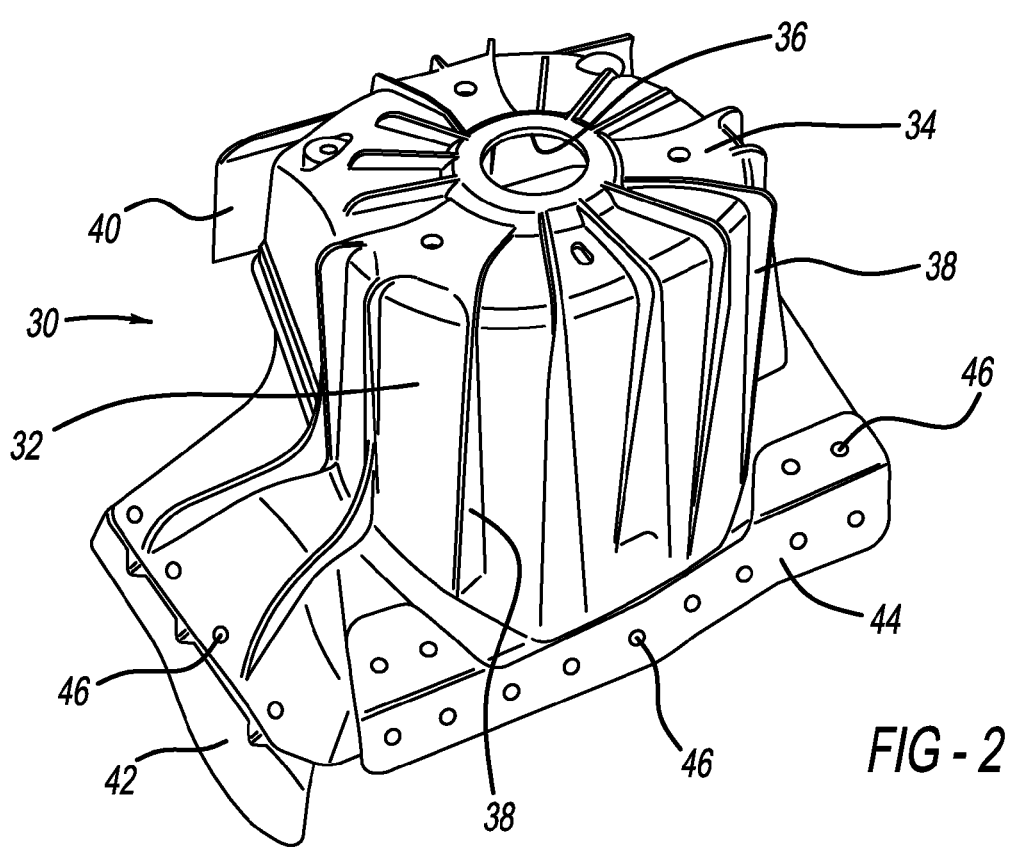
FIG. 2 is a perspective view of a shock tower assembly that incorporates a diecast magnesium shock tower according to the disclosed inventive concept.

Referring to FIG. 2, a perspective view of a shock tower assembly that incorporates a diecast magnesium shock tower according to the disclosed inventive concept is shown. The shock tower assembly, generally illustrated as 30, includes a cast magnesium tower body 32 having a dome portion 34. The cast magnesium tower body 32 is preferably formed by High Pressure Die Casting (HPDC). Because of the superior casting characteristics of magnesium and magnesium alloy compared with aluminum, the cast magnesium or magnesium alloy HPDC shock tower body 32 may be of thin wall design whereby the thickness of the wall is of 2.0 mm wall stock or less.

Figure 3:
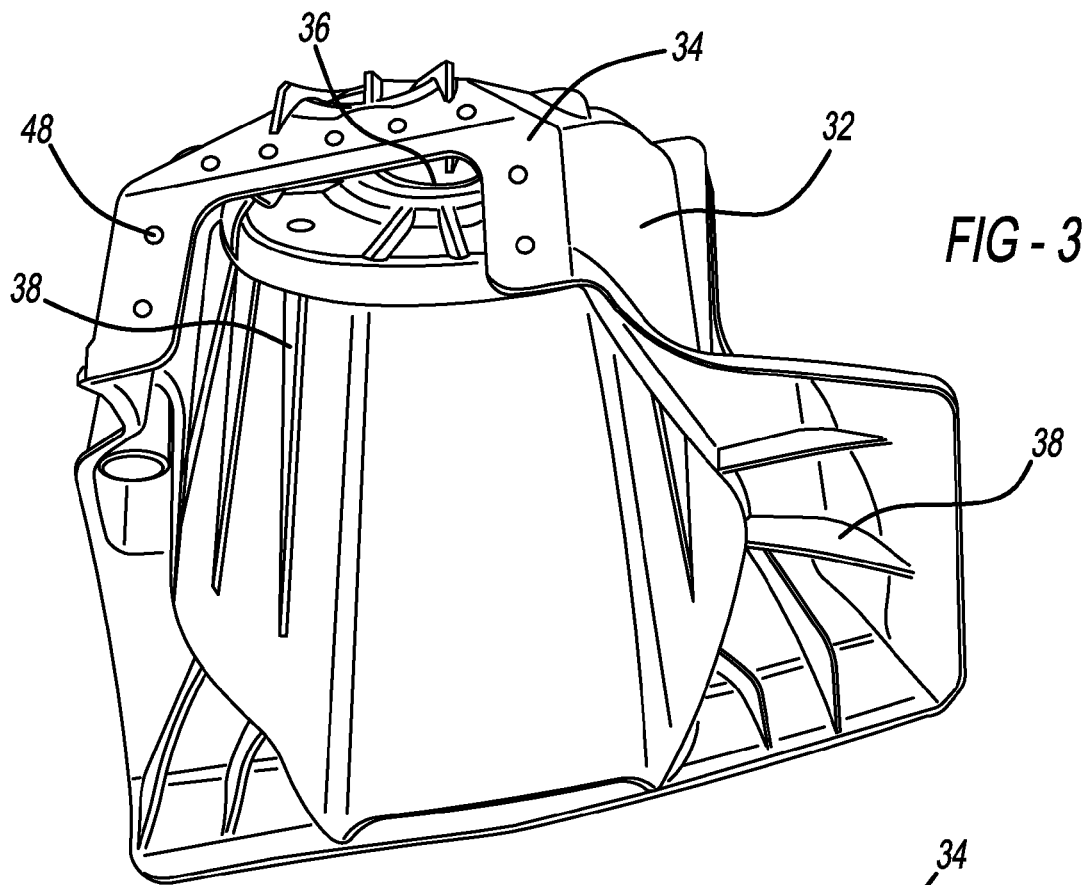
FIG. 3 is a perspective view illustrating a portion of the underside of the diecast magnesium shock tower according to the disclosed inventive concept.

A strut attachment port 36 is formed at the uppermost end of the dome portion 34, and is generally thicker than the rest of the Mg shock tower. The shape of the dome portion 34 and structural ribbings 38 provide for an effective method of transferring the load generated by the strut (not shown) to the adjacent frame rails (not shown). FIG. 3 illustrates the cast magnesium or magnesium alloy HPDC shock tower body 32 as viewed from its back side.

Referring again to FIG. 2, a plurality of structural ribbings 38 is provided to increase integrity of the cast magnesium or magnesium alloy HPDC shock tower body 32 without adding significant weight. The thin wall design of the cast magnesium or magnesium alloy HPDC shock tower body 32 not only saves weight and cost, but also allows more engineered structural ribbings 38. The number, shape, placement and spacing of the structural ribbings 38 demonstrated in FIGS. 2 through 6 are suggestive and are not intended as being limiting. The structural ribbings 38 improve the performance and reduce the cost of the magnesium die casting. The structural ribbings 38 are required for the casting to meet structural performance targets, since steel is stronger than magnesium. In addition, the structural ribbings 38 make possible the thin walled design of the disclosed inventive concept.

The cast magnesium or magnesium alloy HPDC shock tower is lighter and thus more efficient than either an aluminum or aluminum alloy VHPDC shock tower due to its having thinner walls, thinner ribbings and more ribbings with lower draft angles. All of these positive features result in a lighter, stronger and less expensive die casting. These attributes are not achievable with either an aluminum or aluminum alloy VHPDC shock tower due to the viscosity of the aluminum material. Accordingly, the efficient design of the disclosed inventive concept is simply not available through the use of either aluminum or aluminum alloy.

The shock tower assembly 30 of the disclosed inventive concept combines the seven individual stampings of the prior art into a single assembly that includes the cast magnesium tower body 32 and three small bridging brackets. These bridging brackets could include a shotgun bracket 40, a dash cross member bracket 42, and a rail bracket 44, but not limited to these specific brackets. These bridging brackets allow for use of resistive spot welding (RSW) for attachment of the shock tower assembly 30 to the vehicle in the same manner as used today for attaching conventional all-steel shock towers. This approach avoids major body shop investment costs, and significantly improves the ability to provide corrosion protection to the magnesium or magnesium alloy casting.

The shotgun bracket 40, the dash cross member bracket 42, and the rail bracket 44 are attached to the cast magnesium tower body 32 by, preferably, a plurality of mechanical fasteners, such as self-piercing rivets 46 that may be appropriately insulated so as to prevent direct steel-to-magnesium contact, thus avoiding galvanic corrosion due to differing electrode potentials. A plurality of optional fastener holes 48 is illustrated. The fastener holes 48 would not be necessary for self-piercing rivets, but would be necessary for some other mechanical fasteners, such as a screw or a nut-and-bolt assembly.

The shotgun bracket 40 is attached to the upper portion of the wheel well (not shown) by a method such as resistance spot welding. The dash cross member bracket 42 is attached to the dash cross member (not shown) by a method such as resistance spot welding. The rail bracket 44 is also attached to the front rail (not shown) by a method such as resistance spot welding. Variations of the shape and placement of the shotgun bracket 40, the dash cross member 42 and the rail bracket 44 without deviating from the spirit and scope of the disclosed inventive concept are possible.

Figure 4:
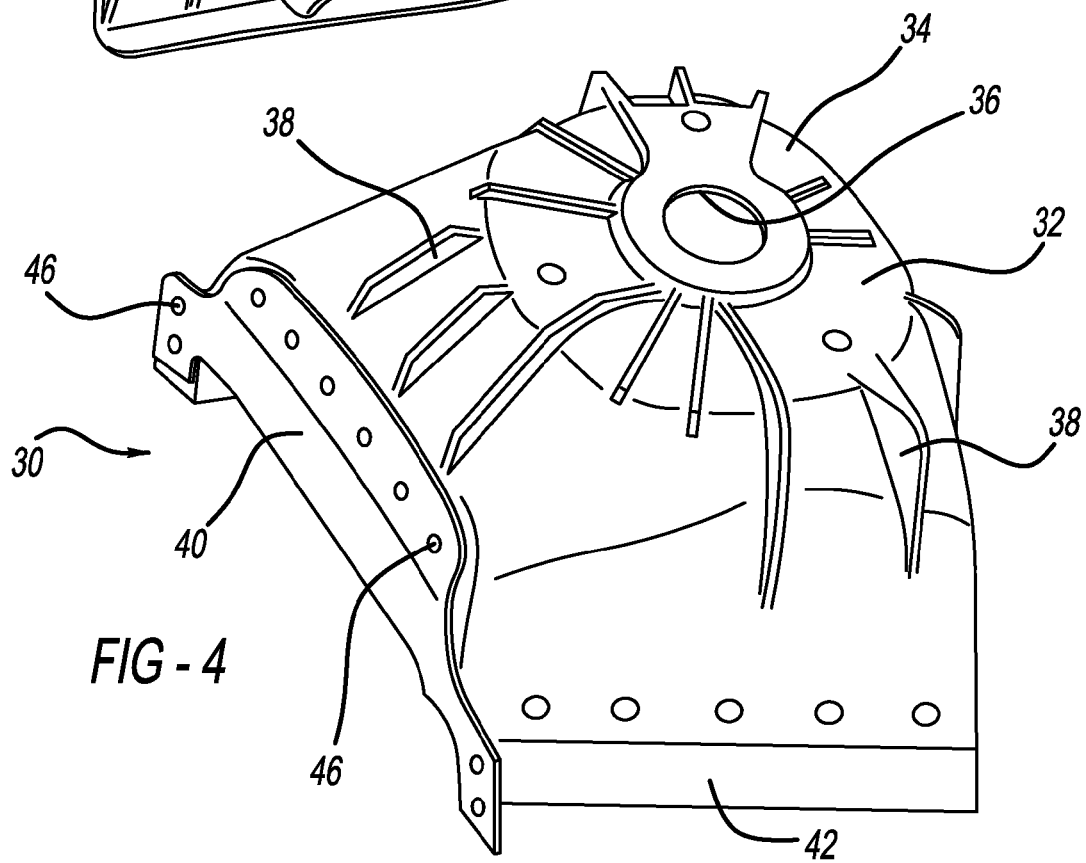
FIG. 4 is a perspective view of the diecast magnesium shock tower assembly according to the disclosed inventive concept.

A view of the shock tower assembly 30 from a perspective different from that of FIG. 2 is illustrated in FIG. 4 in which the shotgun bracket 40 and the dash cross member bracket 42 are shown in their respective positions fitted to the cast magnesium tower body 32. Variations of the shape and placement of the shotgun bracket 40 and the dash cross member 42 without deviating from the spirit and scope of the disclosed inventive concept are again possible.

Figures 5, 6:
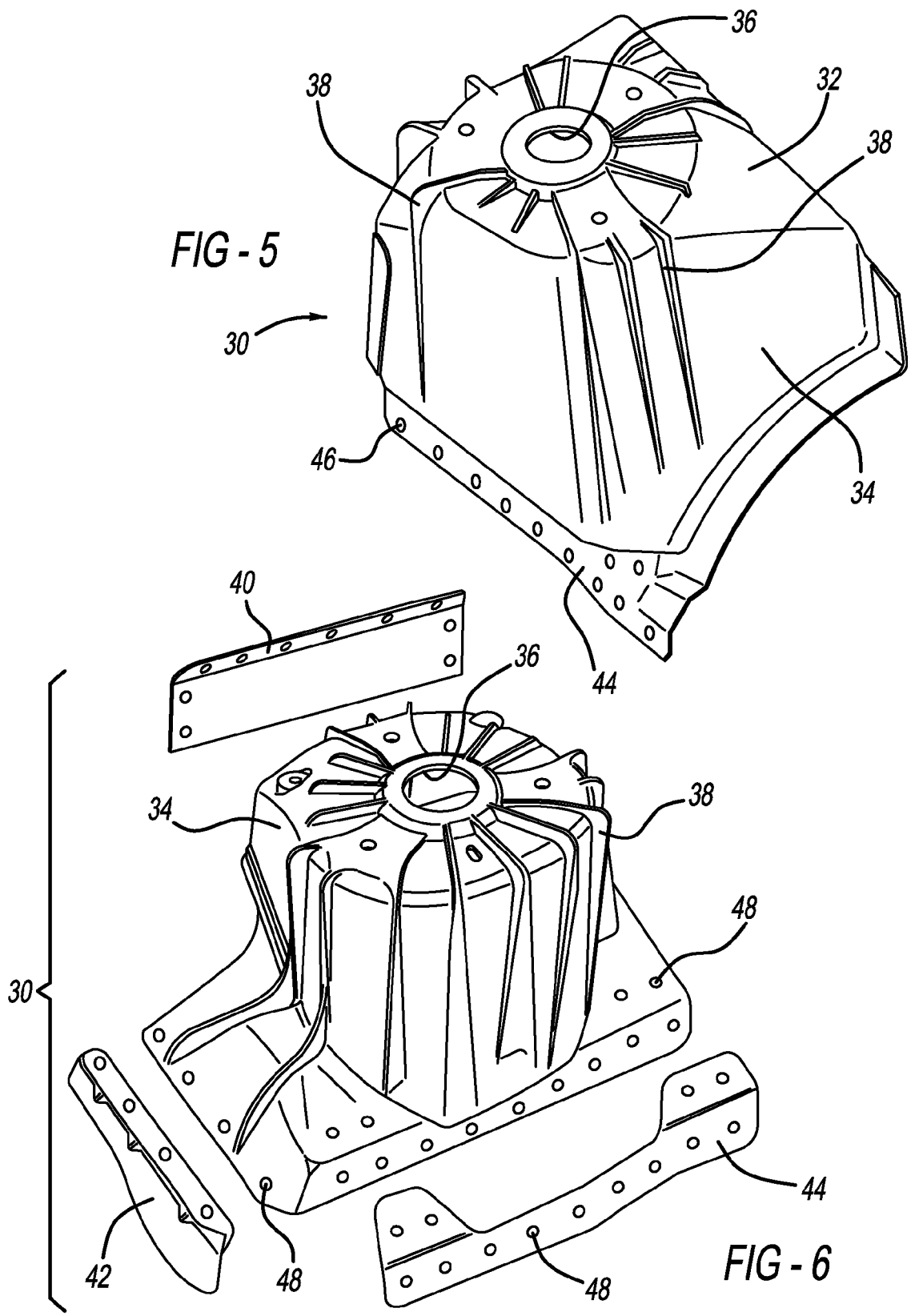
FIG. 5 is an additional perspective view of the diecast magnesium shock tower assembly according to the disclosed inventive concept.
FIG. 6 is a is an exploded perspective view of components that comprise the shock tower assembly of the disclosed inventive concept.

A view of the shock tower assembly 30 from a perspective different from that of both FIG. 2 and FIG. 4 is illustrated in FIG. 5 in which the rail bracket 44 is shown in its position fitted to the cast magnesium tower body 32. As noted above, variations of the shape and placement of the rail bracket 44 without deviating from the spirit and scope of the disclosed inventive concept is again possible.

FIG. 6 illustrates an exploded view of the shock tower assembly 30. In this view, the four individual components of the shock tower assembly 30, specifically, the cast magnesium tower body 32 and the three bridging brackets, the shotgun bracket 40, the dash cross member bracket 42, and the rail bracket 44, are illustrated in relation to one another prior to assembly. The cast magnesium tower body 32 is preferably pre-coated using a conversion coating such as Alodine 5200 (trademark of Henkel Technologies) and a top coating of either powder coating or e-coating prior to sub-assembly.

The illustrated bridging brackets including the shotgun bracket 40, the dash cross member bracket 42, and the rail bracket 44, are mechanically attached to the cast magnesium shock tower body 32 by one or more methods. Three of those methods are illustrated in FIGS. 7 through 9 which are meant as being suggestive and not limiting.

Referring to FIG. 7, a sectional view illustrating the method of joining a steel bridging bracket, for example, the shotgun bracket 40, to the cast magnesium shock tower body 32 using a self-piercing rivet 50 is shown. An adhesive layer 52 is formed between the shotgun bracket 40 (and other brackets) and the cast magnesium shock tower body 32. The adhesive layer 52 functions both as an insulator and as an adhesive between components. A button 54 is formed on the cast magnesium shock tower body 32 upon insertion of the self-piercing rivet 50.

Once the bridging brackets are attached to the cast magnesium shock tower body 32 using the self-piercing rivets, a sealing composition 56 is applied to overcoat the edges of the bracket and the cast magnesium shock tower body 32 to serve as corrosion protection. The sealing composition 56 is preferably the same adhesive material that is used to form the adhesive layer 52, although the sealing composition 56 may alternatively be a different sealing material such as a paint shop sealer.

While FIG. 7 illustrates the insertion of the self-piercing rivet from the steel bridging bracket into the cast magnesium shock tower body 32, it may be desired to insert the self-piercing rivet 50 from the cast magnesium shock tower body 32 into the steel bridging bracket as illustrated in FIG. 8. Referring thereto, a sectional view illustrating the method of joining a steel bridging bracket, again for example, the shotgun bracket 40, to the cast magnesium shock tower body 32 using the self-piercing rivet 50 is shown. The adhesive layer 52 is formed between the shotgun bracket 40 (and other brackets) and the cast magnesium shock tower body 32. A button 58 is formed on the steel bridging bracket 40 upon insertion of the self-piercing rivet 50.

Because the self-piercing rivet 50 is conventionally made of steel, it is desirable to avoid a galvanic reaction between the self-piercing rivet 50 and the cast magnesium shock tower body 32. The galvanic reaction can be avoided through the use of a layer of insulating tape 60 that functions as a barrier to prevent direct contact between the self-piercing rivet 50 and the cast magnesium shock tower body 32. A galvanic reaction may thus be prevented by avoiding direct contact through the use of any isolating layer.

FIGS. 7 and 8 illustrate how a self-piercing rivet can be used to attach any one or all of the shotgun bracket 40, the dash cross member bracket 42, or the rail bracket 44 to the cast magnesium shock tower body 32. However, it is to be understood that other methods of attaching the steel bridging brackets to the cast magnesium shock tower body 32 may be employed. For example, and as illustrated in FIG. 9, a screw 62 may be threaded into a screw boss 64 formed in the cast magnesium shock tower body 32.

The shock tower assembly 30, once fully assembled, is installed in the vehicle as illustrated in FIG. 10 in which a perspective view of the installed shock tower assembly 30 is shown. As illustrated, the shotgun bracket 40 of the shock tower assembly 30 is attached to the upper portion of a wheel well 66 by a method such as resistance spot welding. The dash cross member bracket 42 is attached to a dash cross member 68, again by a method such as resistance spot welding. The rail bracket 44 is also attached to a front rail 70, also by a method such as resistance spot welding.

While the accompanying figures and the associated discussion are directed to a shock tower assembly that includes both steel components and a cast magnesium shock tower body, it is to be understood that the proposed combination of steel components and other cast magnesium vehicle frame parts may be produced according to the disclosed inventive concept.

For at least the above reasons the disclosed invention as set forth above overcomes the challenges faced in the manufacture of known shock towers for vehicles. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A shock tower assembly for a vehicle comprising:
   a cast shock tower body composed of a material selected from the group consisting of magnesium and magnesium alloy;
   a steel bridging bracket;
   an adhesive layer formed between said body and said bracket; and
   a mechanical fastener for fastening said body and said bracket.

2. The shock tower assembly of claim 1, wherein said mechanical fastener is a rivet.

3. The shock tower assembly of claim 2, wherein said rivet is a self-piercing rivet.

4. The shock tower assembly of claim 3, further including an insulating layer formed between at least a portion of said self-piercing rivet and a portion of said cast shock tower body.

5. The shock tower assembly of claim 1, wherein mechanical fastener is a screw.

6. The shock tower assembly of claim 5, wherein said cast shock tower body has a screw boss into which said screw is threaded.

7. The shock tower assembly of claim 1, wherein said cast shock tower body includes a plurality of structural ribbing.

8. The shock tower assembly of claim 1, wherein said steel bridging bracket is selected from the group consisting of a shotgun bracket, a dash cross member bracket, and a rail bracket.

9. The shock tower assembly of claim 1, further including a sealant formed along the intersection of said cast shock tower body and said steel bridging bracket.

10. A shock tower assembly for a vehicle comprising:
    a cast shock tower body composed of a material selected from the group consisting of magnesium and magnesium alloy;
    a steel bridging bracket;
    an adhesive layer formed between said body and said bracket; and
    a self-piercing rivet for fastening said body and said bracket.

11. The shock tower assembly of claim 10, further including an insulating layer formed between at least a portion of said self-piercing rivet and a portion of said cast shock tower body.

12. The shock tower assembly of claim 10, wherein said cast shock tower body includes a plurality of structural ribbing.

13. The shock tower assembly of claim 10, wherein said steel bridging bracket is selected from the group consisting of a shotgun bracket, a dash cross member bracket, and a rail bracket.

14. The shock tower assembly of claim 10, further including a sealant formed along the intersection of said cast shock tower body and said steel bridging bracket.

15. The shock tower assembly of claim 10, wherein said self-piercing rivet includes a rivet head and wherein said rivet head is positioned on said cast shock tower body.

16. The shock tower assembly of claim 10, wherein said self-piercing rivet includes a rivet head and wherein said rivet head is positioned on said steel bridging bracket.

17. A cast shock tower for use in a shock tower assembly for a vehicle, the tower comprising:
    a body composed of a dome and a series of walls, said dome and said walls being composed of a material selected from the group consisting of magnesium and magnesium alloy, said walls having a thickness, said thickness of at least one of said walls being about 2.0 mm;
    a mechanical fastener boss; and
    structural ribbing formed on said body.

18. The cast shock tower of claim 17 further including a pre-coating.

19. The cast shock tower of claim 18 wherein said pre-coating is selected from the group consisting of powder coating and a conversion coating.

* * * * *